May 27, 1924.
P. L. PAGE
1,495,198
TRAFFIC SIGNAL FOR MOTOR VEHICLES
Filed June 3, 1922     2 Sheets—Sheet 1
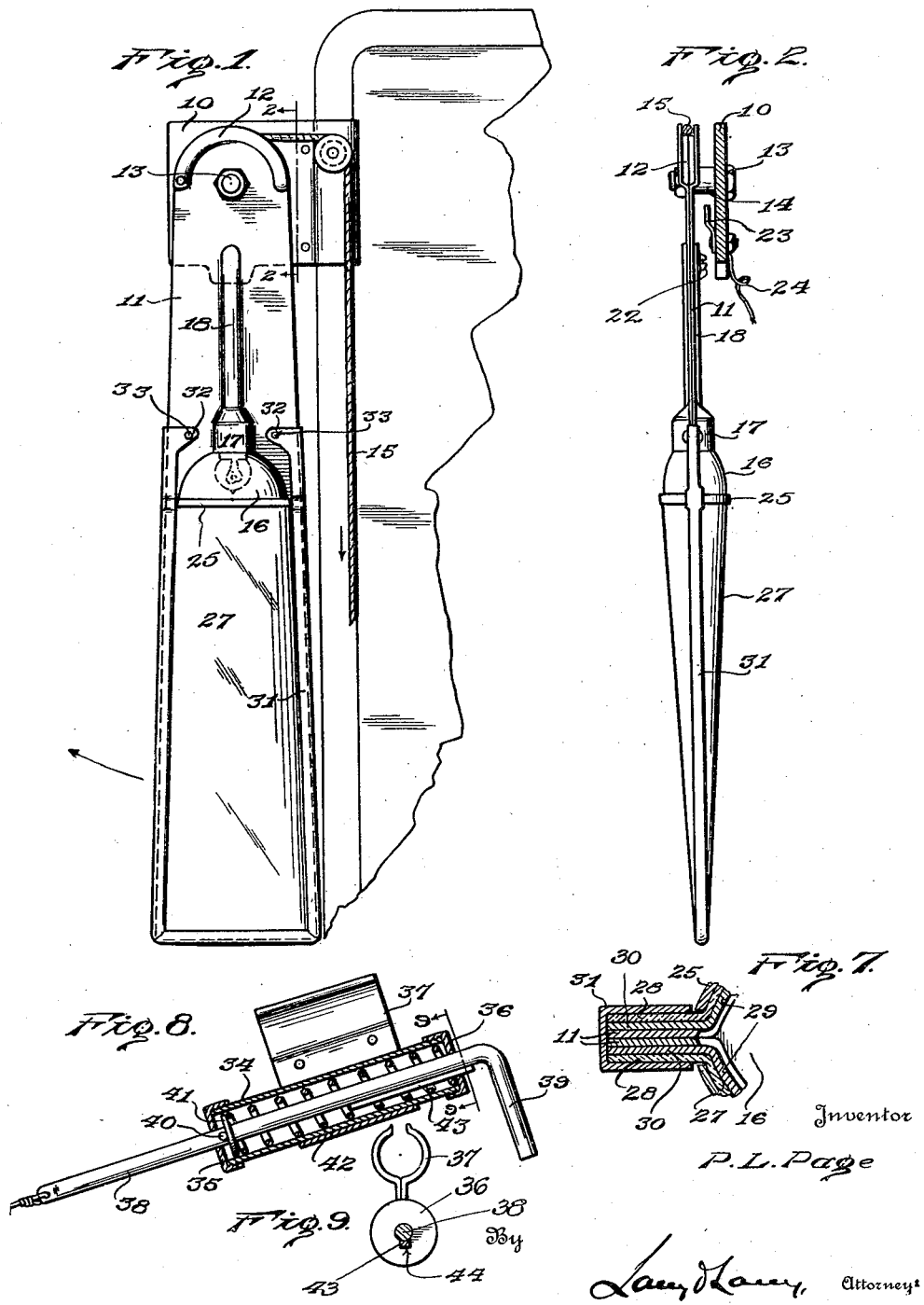
Inventor
P. L. Page
By
Attorneys

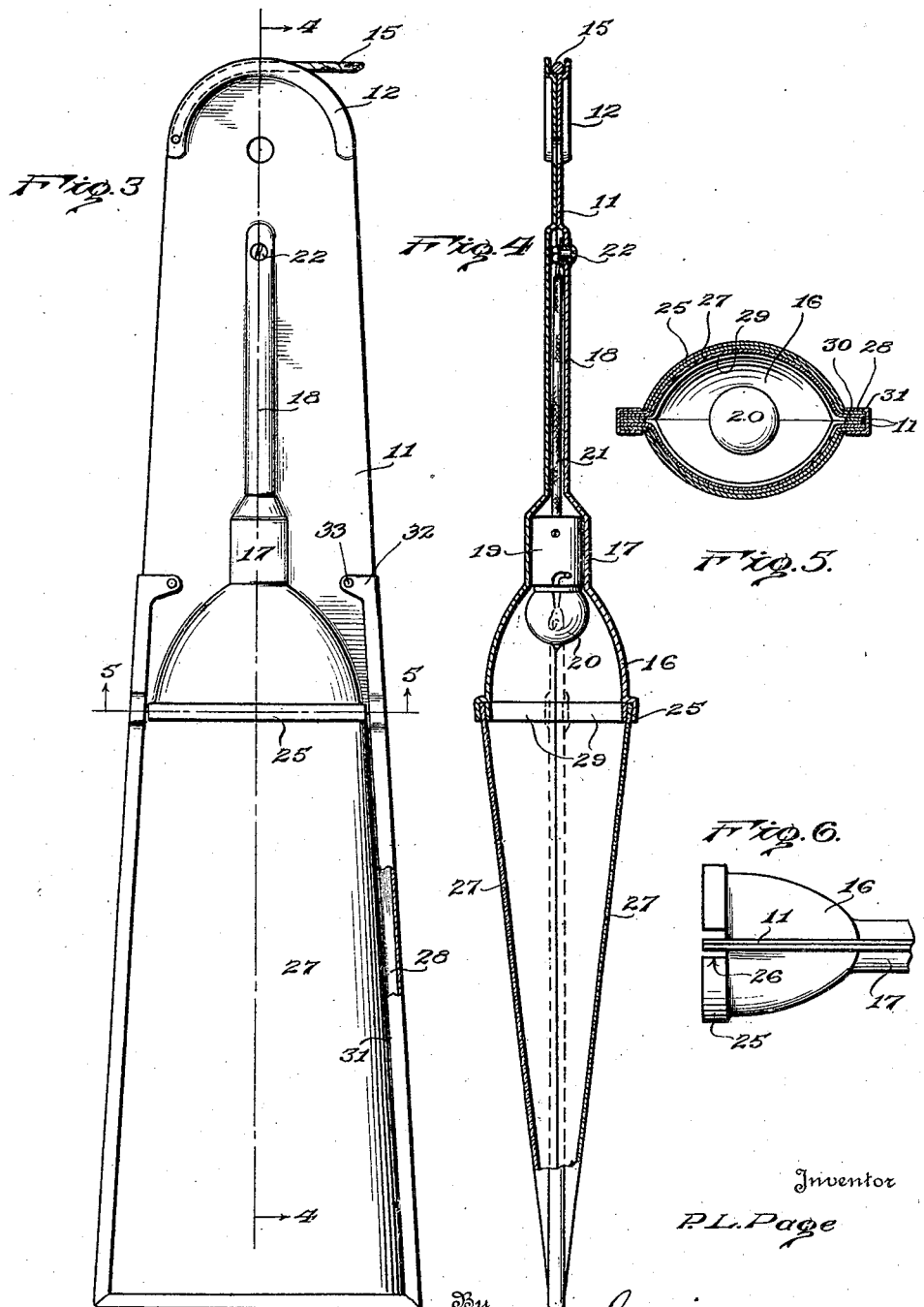

Patented May 27, 1924.

1,495,198

UNITED STATES PATENT OFFICE.

PLENNIE L. PAGE, OF LANSING, MICHIGAN.

TRAFFIC SIGNAL FOR MOTOR VEHICLES.

Application filed June 3, 1922. Serial No. 565,757.

*To all whom it may concern:*

Be it known that I, PLENNIE L. PAGE, citizen of the United States, residing at Lansing, in the county of Ingham and State of Michigan, have invented certain new and useful Improvements in Traffic Signals for Motor Vehicles, of which the following is a specification.

This invention relates to an improved traffic signal for motor vehicles and seeks, as one of its principal objects, to provide a device of this character embodying a semaphore which may be easily mounted at the left of a vehicle wind shield and which may be readily operated for indicating an intention to stop or to turn.

A further object of the invention is to provide a device wherein the semaphore may be illuminated at night and wherein the semaphore will be of such construction that the light thereof cannot be confused with other lights upon the vehicle.

And the invention has as a still further object to provide a device which will be characterized by structural simplicity and which, in practical use, will prove efficient.

Other and incidental objects will appear hereinafter.

In the drawings:

Figure 1 is a fragmentary elevation showing my improved traffic signal in conjunction with a conventional motor vehicle wind shield, Figure 2 is a sectional view on the line 2—2 of Figure 1, looking in the direction of the arrows, Figure 3 is an enlarged side elevation of the semaphore employed, Figure 4 is a sectional view on the line 4—4 of Figure 3, Figure 5 is a sectional view on the line 5—5 of Figure 3, Figure 6 is a fragmentary plan view of the reflector of the semaphore, Figure 7 is an enlarged detail section showing the manner in which the side panes of the semaphore are connected to the butt portion thereof, Figure 8 is a longitudinal sectional view through the controlling device for the semaphore, and Figure 9 is a transverse sectional view on the line 9—9 of Figure 8, looking in the direction of the arrows.

In carrying the invention into effect, I employ a bracket 10 which, as shown in Figure 1, may be clamped to the frame of a vehicle wind shield at the left of the wind shield, and mounted to swing upon said bracket is the semaphore employed. This semaphore includes mating side plates 11 which are preferably of suitable sheet metal and, as best shown in Figures 2 and 4, said plates are offset at their inner ends to define a channel 12. Extending through the plates is a bolt 13 clamping the plates together and pivotally connecting the semaphore with the bracket 10, a spacing sleeve 14 being disposed between the semaphore and the bracket. Secured at one end in the channel 12 is a cable or other suitable flexible element 15.

At their outer or forward ends, the side plates 11 are bulged laterally to provide mating portions of a reflector 16 at the inner end of which is a chamber 17 and pressed from the plates medially thereof are companion channel members mating to define a tube 18 extending rearwardly from said chamber. Mounted in the chamber 17 is an appropriate light socket 19 in which is removably fitted a lamp 20 and extending from said socket through the tube 17 is a circuit wire 21. Extending transversely through one of the side plates at the rear end of said tube is an insulated bolt or terminal 22 to which the wire is connected and mounted upon the bracket 10 is a spring contact 23 disposed to engage said terminal when the semaphore is swung upwardly to horizontal position. The contact is, of course, insulated from the bracket and connected with said contact is a feed wire 24 leading from the battery of the vehicle to which the device is attached or other suitable source of electrical energy thereon.

At its forward margin the reflector 16 is offset to define a flange 25 which, as shown in Figure 6, is provided at the upper and lower sides of the reflector with notches 26. Fitting at their rear ends in said flange are mating side panes 27 gradually flattened toward their forward ends and provided with flat margins 28 extending through said notches. Overlying the inner end margins of said panes are bowed clamping springs 29 seating flat against the panes and provided at their ends, as best shown in Figure 7, with lateral terminals 30 extending through the notches 26 between the side margins 28 of the panes and the side margins of the plates 11. Thus, the springs will tend to spread the panes and firmly bind the panes within the flange 25 of the reflector. Clamping the panes together is a channel shaped frame 31 embracing the margins 28 of the panes and extending along the upper and lower sides of the semaphore as well as the outer end thereof, the ends of the frame straddling the upper and lower margins of the plates 11. Formed on the frame at its ends are ears 32 and extending through said ears are bolts or other suitable fastening devices 33 connecting the frame with said plates so that the frame will thus serve to rigidly support the side panes 24 in position. In this connection it will be observed, as best shown in Figure 1, that the side panes are somewhat longer than the side plates while the semaphore is gradually widened toward its outer end, the panes being tapered to conform to the taper of the side plates.

The semaphore may be operated by a foot pedal but, when preferred, I employ an operating device of the character shown in Figures 8 and 9 of the drawings. Said device includes a cylinder 34 closed at its ends by end caps 35 and 36 and associated with the cylinder is a clamp 37 for connecting the cylinder with the steering post of the vehicle. Slidable through the end caps 35 and 36 is an operating rod 38 connected at its lower end to the cable 15, the intermediate portion of the cable being, of course, trained around suitably located pulleys. At its upper end the rod is formed with a handle 39 and extending through the rod is a pin 40 with which coacts a washer 41. Bearing between said washer and the cap 36 of the cylinder is a spring 42 pressing the rod downwardly. Fixed to the upper end portion of the rod is a longitudinally directed bar 43 slidably received through a notch 44 in the end cap 36.

To operate the semaphore, the rod 38 is pulled upwardly until the lower end of the bar 43 clears the end cap 36. In this position of the rod, the semaphore will, as will be at once understood, have been swung upwardly to horizontal position so that the rod 38 may then be rotated slightly to dispose the bar 43 out of register with the notch 44. Accordingly, the bar will then coact with the end cap 36 of the cylinder 34 for holding the rod 38 retracted and maintaining the semaphore elevated. As the semaphore is swung upwardly, the contact 22 will, as previously described, engage the terminal 23 so that the lamp 20 will be energized. Accordingly, the semaphore will be illuminated throughout the major portion of its length and by employing the elongated panes 27 upon the semaphore, the possibility of confusing the light of the semaphore with any of the other lights upon the vehicle will be eliminated. To release the semaphore, the rod 32 is turned to again bring the bar 43 into register with the notch 44 when the spring 42 will immediately press the rod downwardly while the semaphore will gravitate downwardly to its normal vertical position. I accordingly provide a device wherein the semaphore may be easily manipulated.

Having thus described the invention, what is claimed as new is:

1. In a traffic signal for motor vehicles, a semaphore including like opaque mating side plates secured together side by side, pivotally mounted at one end and having their free ends expanded and of arcuate form transversely of the plates to form a reflecting chamber, mating transparent side panes fitted at their inner end edges to the outer end edges of the said plates and projecting outwardly therefrom, a lamp mounted in said reflecting chamber at the inner end thereof, and means engaging the margins of the side plates and the panes to secure the same together.

2. In a traffic signal for motor vehicles, a semaphore including companion opaque side plates pivotally mounted at their inner ends and having their outer free ends expanded to form a reflecting chamber and having their intermediate portions provided with opposed longitudinal channels forming a tube extending inwardly from said reflecting chamber, a terminal at the rear end of said tube, a light socket at the forward end of said tube adapted to support a lamp in said reflecting chamber, a circuit wire extending through the tube and connecting said socket and terminal, mating transparent side panes fitted at their inner ends to the outer end of the reflecting chamber, and means to secure the side plates and the panes together.

3. In a traffic signal for motor vehicles, a semaphore having an opaque inner end portion and a transparent outer end portion formed of mating side panes, the opaque inner end portion of the semaphore being provided at its forward end with a reflector having the inner ends of the panes fitting therein, means clamping the inner ends of the panes to the outer ends of the reflector, and means forming a rigid connection between the said panes and the opaque end portion of the semaphore.

4. In a traffic signal for motor vehicles, a semaphore having an opaque inner end portion provided at its forward end with a reflector offset to define a flange, the flange being formed with notches therein, mating side panes fitting in said flange forming the outer end portion of the semaphore and provided with flat margins extending through said notches, springs overlying the inner end margins of the panes and provided with terminals extending through said notches, and a frame embracing the margins of the panes and connected to the inner end portion of the semaphore rigidly supporting the panes.

In testimony whereof I affix my signature.

PLENNIE L. PAGE. [L. S.]